US007010124B1

(12) United States Patent
Ishiguro et al.

(10) Patent No.: US 7,010,124 B1
(45) Date of Patent: *Mar. 7, 2006

(54) LOCATION DEPENDENT KEY FOR DECRYPTING COPY PROTECTED MATERIAL ON A RECORDING MEDIUM

(75) Inventors: Ryuji Ishiguro, Tokyo (JP); Masafumi Minami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/287,924

(22) Filed: Apr. 7, 1999

Related U.S. Application Data

(63) Continuation of application No. 08/721,310, filed on Oct. 15, 1996, now Pat. No. 5,917,910.

(30) Foreign Application Priority Data

Oct. 16, 1995 (JP) .................................. 7-267252

(51) Int. Cl.
 *H04L 9/00* (2006.01)
(52) U.S. Cl. ...................... 380/201; 380/277; 380/46; 713/193
(58) Field of Classification Search ............... 713/193; 705/57; 380/201, 277, 46
See application file for complete search history.

(56) References Cited

U.S. PATENT DOCUMENTS

| | | | | |
|---|---|---|---|---|
| 3,985,952 | A * | 10/1976 | Adler ....................... 178/6.6 R |
| 5,058,164 | A * | 10/1991 | Elmer et al. ................. 713/190 |
| 5,148,422 | A * | 9/1992 | Sako et al. ............... 369/44.26 |
| 5,327,563 | A * | 7/1994 | Singh ......................... 713/193 |
| 5,412,718 | A * | 5/1995 | Narasimhalu et al. ........ 705/51 |
| 5,416,840 | A * | 5/1995 | Cane et al. .................... 705/52 |
| 5,467,398 | A * | 11/1995 | Pierce et al. ................... 380/44 |
| 5,538,773 | A * | 7/1996 | Kondo ....................... 428/64.1 |
| 5,563,947 | A * | 10/1996 | Kikinis ......................... 705/51 |
| 5,572,507 | A * | 11/1996 | Ozaki et al. ............. 369/53.21 |
| 5,590,200 | A * | 12/1996 | Nachman et al. ............. 380/46 |
| 5,596,639 | A * | 1/1997 | Kikinis ........................... 380/4 |
| 5,694,469 | A * | 12/1997 | Le Rue ....................... 705/51 |
| 6,084,966 | A * | 7/2000 | Maebara et al. .............. 380/43 |

OTHER PUBLICATIONS

Menezes et. al. Handbook of Applied Cryptography CRC Press.*
Schneier Applied Cryptography John Weley and Sons.*
Davis et. al. Cryptographic Randomness from Air Turbulence in Disk Drives Crypto 94, Aug. 1994 pp. 114-120.*

* cited by examiner

*Primary Examiner*—Ayaz Sheikh
*Assistant Examiner*—Brandon Hoffman
(74) *Attorney, Agent, or Firm*—Oblon, Spivak, McClelland, Maier & Neustadt, P.C.

(57) ABSTRACT

Information to be recorded is encrypted using an encryption key based on information inherent in a recording medium. The information inherent in the recording medium is specific information on a disk. When an encrypted information recorded on a recording medium is decrypted, there are reproduced from a recording medium a first file storing information encrypted by using an encryption key generated based on a random data to be inserted into a predetermined portion of the encrypted information to be recorded on a recording medium and a second file storing data indicative of a predetermined portion of the random data to be inserted into a predetermined portion of the encrypted information. The random data is detected from the encrypted information. A decryption key is generated from the detected random data. The encrypted information of the reproduced first file is decrypted using the decryption key.

36 Claims, 14 Drawing Sheets

| Sector number 1 / Offset |
|---|
| Sector number 2 / Offset |
| Sector number 3 / Offset |
| ⋮ |
| Sector number (n-1) / Offset |
| Sector number n / Offset |

F I G. 15
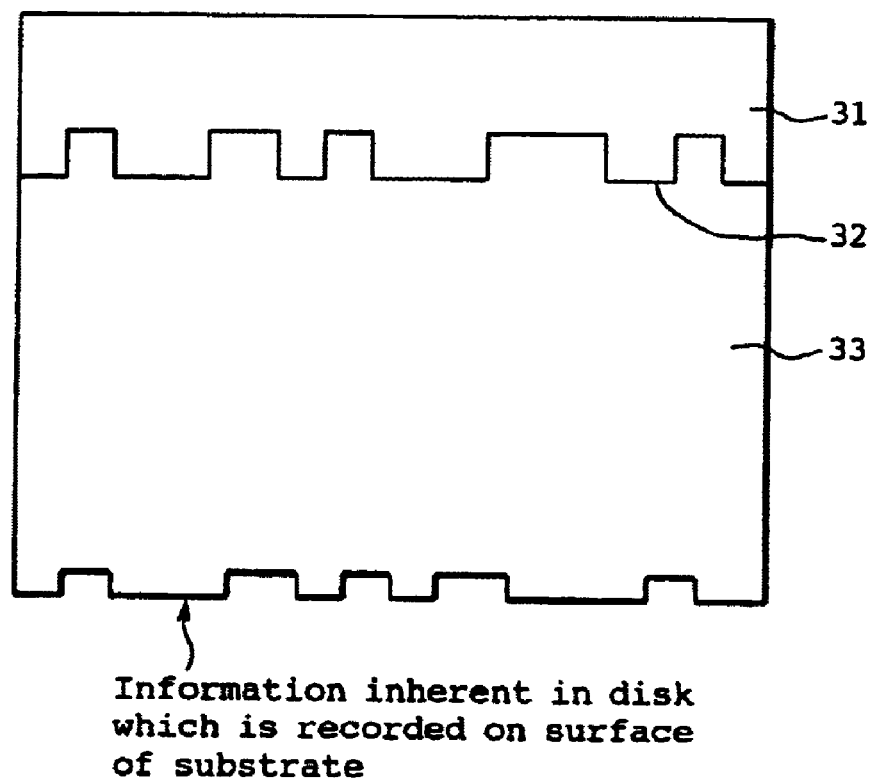
Information inherent in disk which is recorded on surface of substrate

LOCATION DEPENDENT KEY FOR DECRYPTING COPY PROTECTED MATERIAL ON A RECORDING MEDIUM

This is a continuation of application Ser. No. 08/721,310 having a filing date of Oct. 15, 1996 which has matured into patent U.S. Pat. No. 5,917,910.

BACKGROUND OF THE INVENTION

1. Field of the Invention

The present invention relates to an encrypting method and apparatus, a decrypting method and apparatus, and a recording medium in which information encrypted by an encrypting method or an encrypting apparatus is recorded; and more particularly to an encrypting method and apparatus, a decrypting method and apparatus, and a recording medium suitable for use in a system in which information such as video signals, audio signals, data signals or the like is encrypted, the encrypted information is recorded on a recording medium, and the encrypted information is decrypted.

2. Description of the Related Art

Typically when information is encrypted for recording on a recording medium, the information is encrypted by using a predetermined encryption key. The encrypted information is decrypted by using a decryption key.

Two known types of cryptosystems which employ a key (an encryption key) include: a common-key cryptosystem and a public-key cryptosystem. In the common-key cryptosystem, a key (encryption key) used upon encryption is the same as a key (decryption key) used upon decryption. Frequently a data encryption standard (DES) is employed in common-key cryptosystems. On the other hand, in public-key cryptosystems, the encryption key and the decryption key are different from each other. In public-key cryptosystems, it is common to open the encryption key to the public, while the decryption key is kept secret. In general, such encryption methods and decryption methods are known.

An encryption method is disclosed in Japanese patent publication No. 60007/1990. According to the method, an encryption key is generated based on a data forming a file to be recorded on a recording medium. Information is encrypted by using the encryption key, and the encrypted information is recorded on the recording medium. The file is reproduced from the recording medium, and a decryption key is generated based on data forming the file. Then, the encrypted information is decrypted by using the generated decryption key.

However, when such encryption and decryption methods are employed, the file used for generating the encryption key is recorded on one portion (sequent regions) of the recording medium, which may allow the file to be duplicated with comparative ease.

SUMMARY OF THE INVENTION

In view of the foregoing, it is an object of the present invention to provide encryption method and apparatus, a recording method, and a decryption method and apparatus which provide robust copy protection. It is a further object of the invention to provide a recording medium where information encrypted by the encrypting apparatus may be recorded.

According to a first aspect of the present invention, when information to be recorded is encrypted by using an encryption key, the encryption key is generated on the basis of information inherent in a recording medium and the information to be recorded on the recording medium is encrypted based on the encryption key. The information inherent in the recording medium may be information from one or more predetermined areas of the medium.

According to a second aspect of the present invention, an encrypting apparatus for encrypting information to be recorded by using an encryption key includes a means for generating an encryption key based on information inherent in a recording medium, and a means for encrypting the information to be recorded on the recording medium based on the encryption key. The information inherent in the recording medium may be information from one or more predetermined areas of the medium.

According to a third aspect of the present invention, when information obtained by encrypting information to be recorded by using an encryption key is recorded on a recording medium, the encrypted information is generated according to an encryption key, which is in turn generated according to information inherent in the recording medium. The information inherent in the recording medium may be information from one or more predetermined areas of the medium.

According to a fourth aspect of the present invention, when encrypted information recorded on a recording medium is decrypted, there are reproduced from the recording medium a first file storing information encrypted according to an encryption key generated on the basis of random data that is inserted into one or more predetermined portions of the encrypted information, and a second file storing data indicative of at least a portion of the random data that is inserted into the encrypted information. The random data is detected from the encrypted information stored in the reproduced first file based on the data stored in the reproduced second file. A decryption key is generated from the detected random data. The encrypted information of the reproduced first file is decrypted by using the decryption key.

According to a fifth aspect of the present invention, a decrypting apparatus for decrypting encrypted information recorded on a recording medium includes a means for reproducing from the recording medium a first file storing information encrypted according to an encryption key generated on the basis of random data that is inserted into one or more predetermined portions of the encrypted information, and a second file storing data indicative of at least a portion of the random data that is inserted into the encrypted information, a means for detecting the random data from the encrypted information stored in the reproduced first file based on the data stored in the reproduced second file, a means for generating a decryption key from the detected random data, and a means for decrypting the encrypted information of the reproduced first file by using the decryption key.

According to a sixth aspect of the present invention, a recording medium capable of use in a decrypting apparatus includes a recorded signal capable of being decrypted by the decrypting apparatus. The recorded signal includes a first file storing information encrypted by using an encryption key generated on the basis of random data that is inserted into one or more predetermined portions of the encrypted information.

BRIEF DESCRIPTION OF THE DRAWINGS

FIG. 15 is a cross-sectional view of a disk recording medium in accordance with the present invention.

DESCRIPTION OF THE PREFERRED EMBODIMENTS

An embodiment of the present invention will hereinafter be described with reference to the accompanying drawings. The "information" referred to in the description may be, for example, video information, audio information, text information and so on. The "recording media" referred to in the description may be, for example, disk-like recording media such as digital video disks (DVD), optical disks, magneto-optical disks, magnetic disks such as flexible disks or hard disks, and so on, and tape-like recording media such as magnetic tapes or the like.

The recording media mentioned above may be mass produced through duplication of a master disk, a master magnetic tape or the like. The data (e.g. plain text) to be encrypted may be data that is subjected to the scrambling, shuffling, and encoding of a moving picture experts group (MPEG) system, joint photographic experts group (JPEG) system and so on. In accordance with the data to be encrypted, data decrypted from encrypted data may be data appropriate for de-scrambling, de-shuffling, and decoding according to the MPEG system, to the JPEG system and so on.

Figure 1:
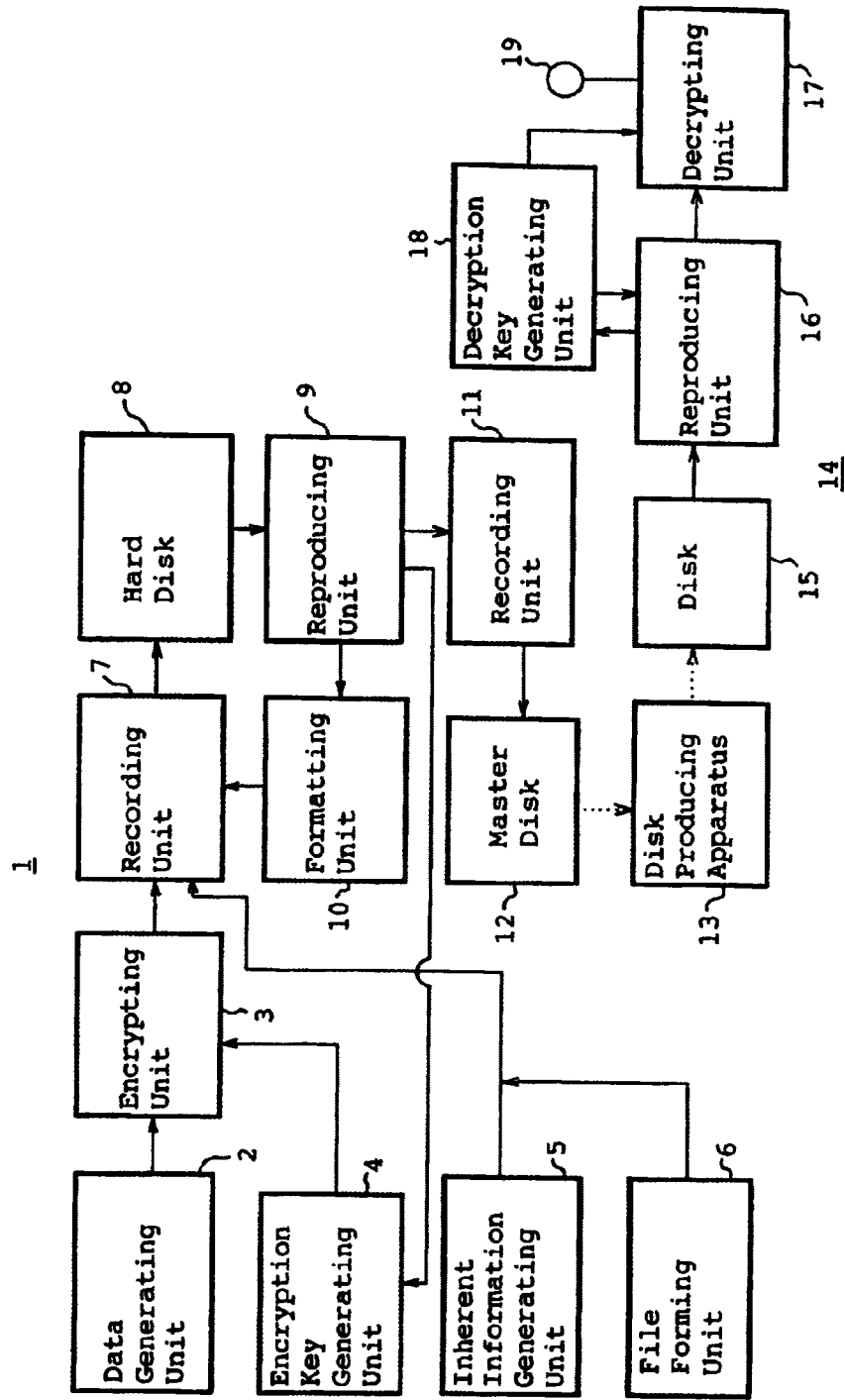
FIG. 1 is a block diagram showing an encrypting apparatus and a decrypting apparatus according to a first embodiment of the present invention.

FIG. 1 is a block diagram showing an arrangement of an encrypting apparatus and a decrypting apparatus according to the first embodiment of the present invention, by way of example.

An encrypting apparatus 1 includes a data generating unit 2 which is formed of a reproducing apparatus for reproducing data (such as digital video data, digital audio data or the like) from a recording medium. The data generating unit 2 outputs the reproduced data (e.g. plain text) to an encrypting unit 3. The encrypting unit 3 encrypts the data output from the data generating unit 2 and outputs encrypted data (i.e. a cryptogram) to a recording unit 7 which will be described later on.

Figure 2:
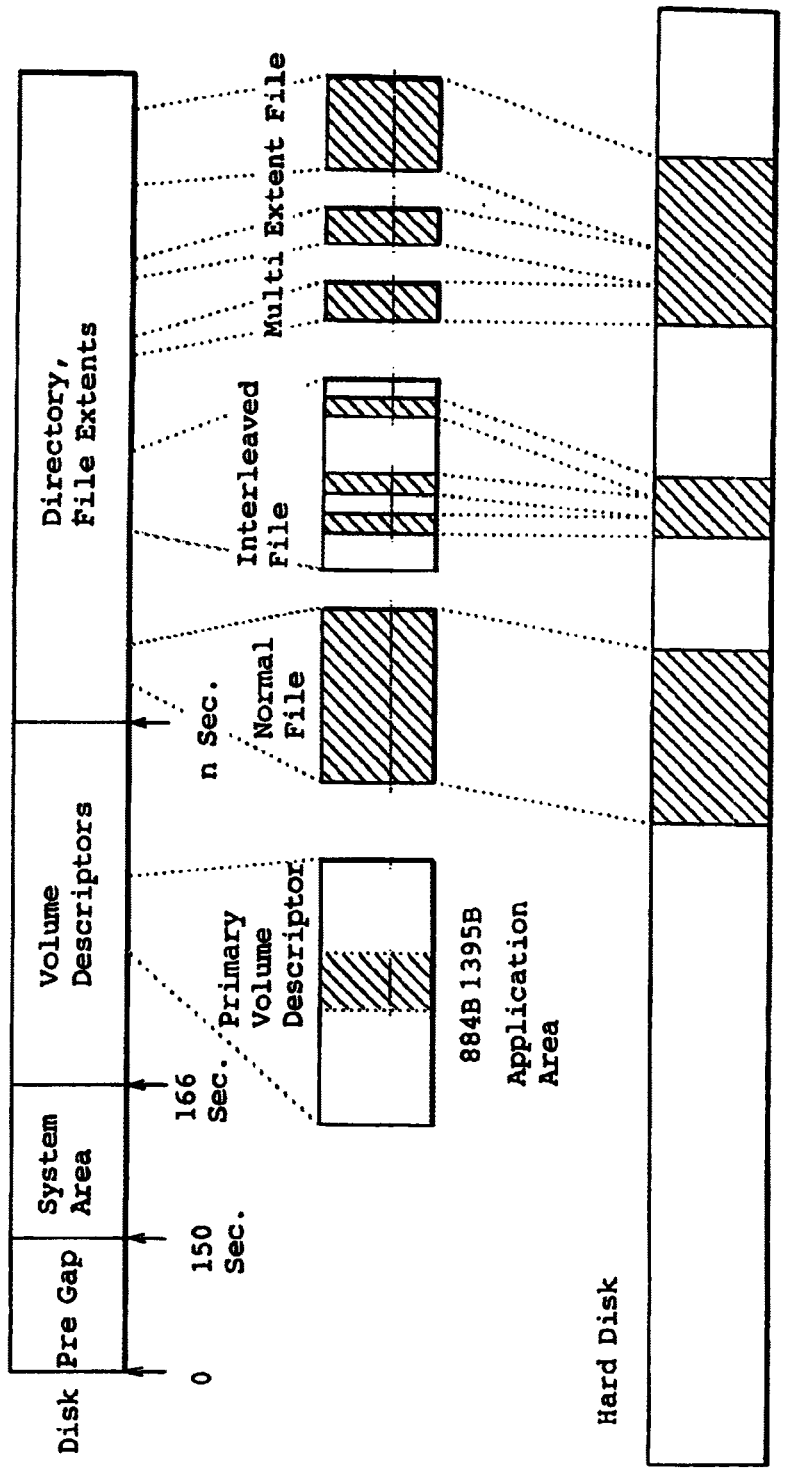
FIG. 2 is a diagram showing a logical file format according to the ISO9660 standard.

The encrypting apparatus also includes an inherent information generating unit 5. The inherent information generating unit outputs to the recording unit 7 information which, for purposes of describing the invention, will be considered inherent in a recording medium. For example, random number data may be employed as the information inherent in the recording medium, in which case the random number data is recorded by the recording unit 7 on a predetermined region of the recording medium (e.g. a disk) as a normal file as shown in FIG. 2. Indeed, since the random data is in the form of a normal file, the random data can be copied. But, when this file is copied to the recording medium, such as a hard disk or the like, as shown in FIG. 2, the position (allocation) of this file is changed, which means that a duplicate of an original medium (e.g. read-only disk), having the normal file in the same position as the original, cannot be created.

FIG. 2 is a diagram showing a logical file format according to the ISO9660 standard. As shown in FIG. 2, sectors 0 to 149 are set as a pre gap area where data may or may not be recorded. Sectors 150 to 165 are set as a system area where, for example, copyright information is stored. Subsequent sectors 166 to n-1 (where n is an integer) are set as volume descriptors where management information is stored.

The volume descriptors include a primary volume descriptor where a table of directories (path table) and so on are stored. Sector n and succeeding sectors are user-accessible areas where predetermined files are stored. Each of the sectors is formed of 2 kbytes, and an offset is used to indicate a position therein.

As shown in FIG. 2, for example, the random data can be recorded as an interleaved file. Moreover, the random data can be recorded as a multi extent file. The interleaved file is a file of the random data recorded on a plurality of discontinuous portions in a predetermined area. The multi extent file is a file of the random data which are recorded on a plurality of discontinuous areas as one file.

When the random data is recorded as the interleaved file or the multi extent file, the random data can be recorded in dispersed positions, which makes it more difficult to match the position of the random data recorded on the read-only disk with the position of the random data obtained by copying the random data from the read-only disk.

Moreover, it is possible to record the random data in the pre gap area or on the system area according to the ISO9660 standard. When the random data is recorded in either of the above areas, the recorded random data cannot be accessed as a normal file, which makes it difficult to copy the random data.

Moreover, it is possible to record the random data in an application area which is Located in bytes 884–1395 of the primary volume descriptor area. The ISO9660 standard specifies that the application area stores header information, therefore when random data is recorded in this area it cannot be accessed as a normal file, which makes it difficult to copy.

The random data is finally recorded on a master disk 12 as shown in FIG. 1.

The encrypting apparatus 1 includes a file forming unit 6 for forming a file (digest method file) indicative of a predetermined portion of data on a recording medium. More particularly, the file forming unit 6 specifies sector numbers and/or offsets which indicate locations of the inherent information (e.g. random data) within the data (encrypted data+random data) that is recorded on the recording medium. Then, the file forming unit 6 forms a file (digest method file) formed of one or plural pairs of sector numbers and offsets (byte number in a sector). The file indicative of a predetermined portion of the encrypted and random data (the digest method file) is inserted into a predetermined area on master disk 12 such that the master disk contains the encrypted data, the random data, and the digest method file.

The encrypting apparatus 1 includes the recording unit 7 for recording on a hard disk 8 the random data supplied from the inherent information generating unit 5, the digest method file supplied from the file forming unit 6, and the encrypted data supplied from the encrypting unit 3. The encrypting apparatus 1 includes a reproducing unit 9 formed of a magnetic head, an amplifier and so on. The reproducing unit 9 reads out the random data from the hard disk 8 based on the digest method file recorded on the hard disk 8 and supplies the read random data to the encryption key generating unit 4. The reproducing unit 9 also reads out the encrypted data and supplies the encrypted data together with the random data and the digest method file to a formatting unit 10.

The formatting unit 10 formats the encrypted data and the digest method file supplied from the reproducing unit 9 to produce a pre-master image. The formatting unit 10 supplies the pre-master image to the recording unit 7. At this time, as described above, the formatting unit 10 can format the random data as the normal file according to the ISO9660 standard, and, as described above, can format the data as the interleaved file or the multi extent file. The recording unit 7 records the pre-master image on the hard disk 8. The encrypting apparatus 1 includes a recording unit 11 formed of an optical head, an amplifier and so on. The recording unit 11 records the pre-master image reproduced from the hard disk 8 by the reproducing unit 9 on the master disk 12. A disk producing apparatus 13 employs the master disk 12 as an original disk to reproduce a large number of disks 15 (slave disks).

A decrypting apparatus 14 includes a reproducing unit 16, a decrypting unit 17, a decryption-key generating unit 18, and an output terminal 19. The reproducing unit 16 reproduces the disk 15. The decryption-key generating unit 18 generates a decryption key based on a reproduced signal supplied from the reproducing unit 16, and outputs the decryption key to the decrypting unit 17 which will be described later on. The decrypting unit 17 decrypts the reproduced signal supplied from the reproducing unit 16 based on the decryption key supplied from the decryption-key generating unit 18.

Figure 3:
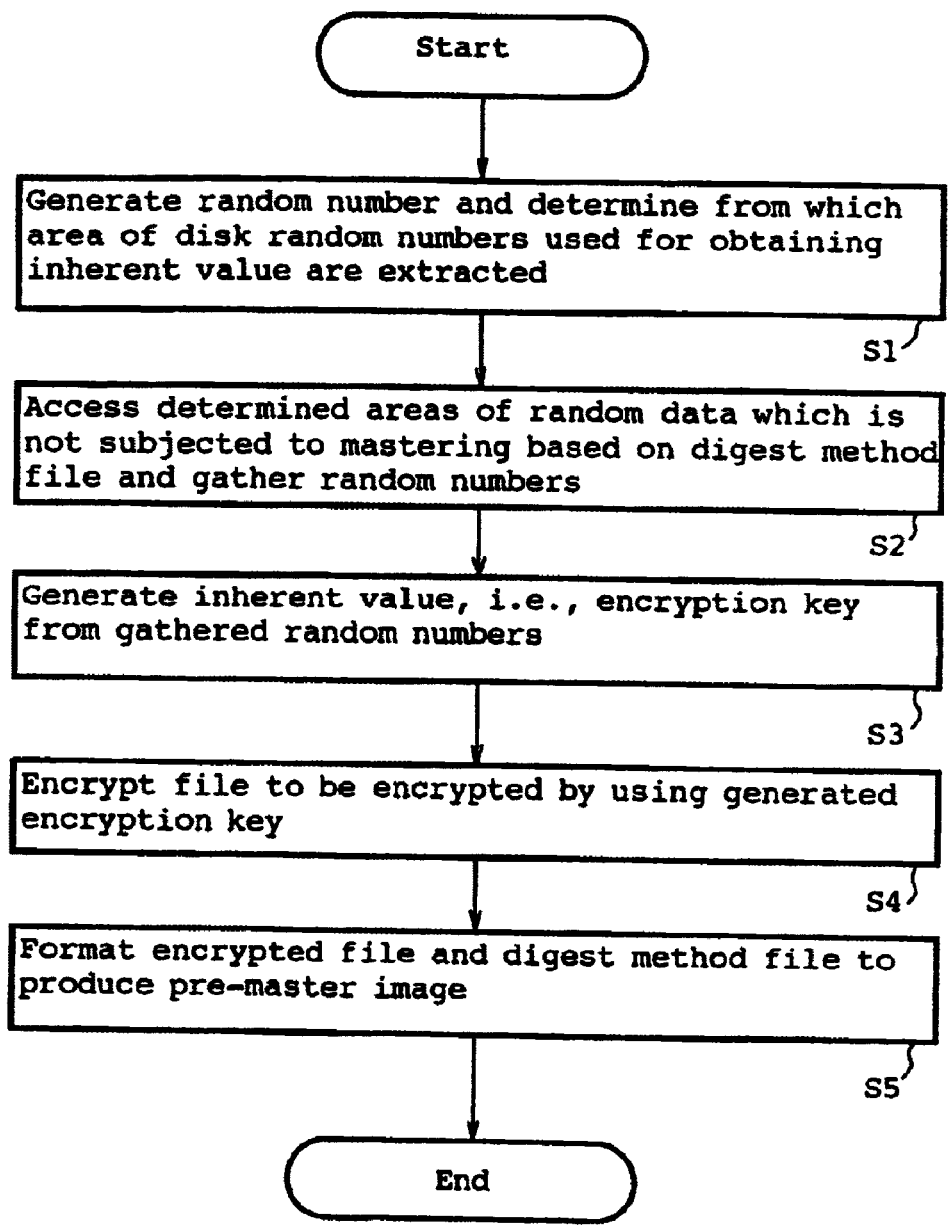
FIG. 3 is a flowchart used to explain an encrypting operation of an encrypting apparatus according to the first embodiment of the present invention.

An encrypting operation of the encrypting apparatus 1 will be described with reference to FIG. 3 which is a flowchart therefor. In step S1, initially, the inherent information generating unit 5 generates the random data (random-number data) which is considered to be information inherent in the recording medium (encryption key) and supplies the random data to the recording unit 7. In this step, the file forming unit 6 determines from which area(s) of the master disk 12 the random data (random-number data) used as the information inherent in the recording medium (encryption key) is extracted, and then produces a file (digest method file) indicative of the determined area(s).

Figures 4, 5:
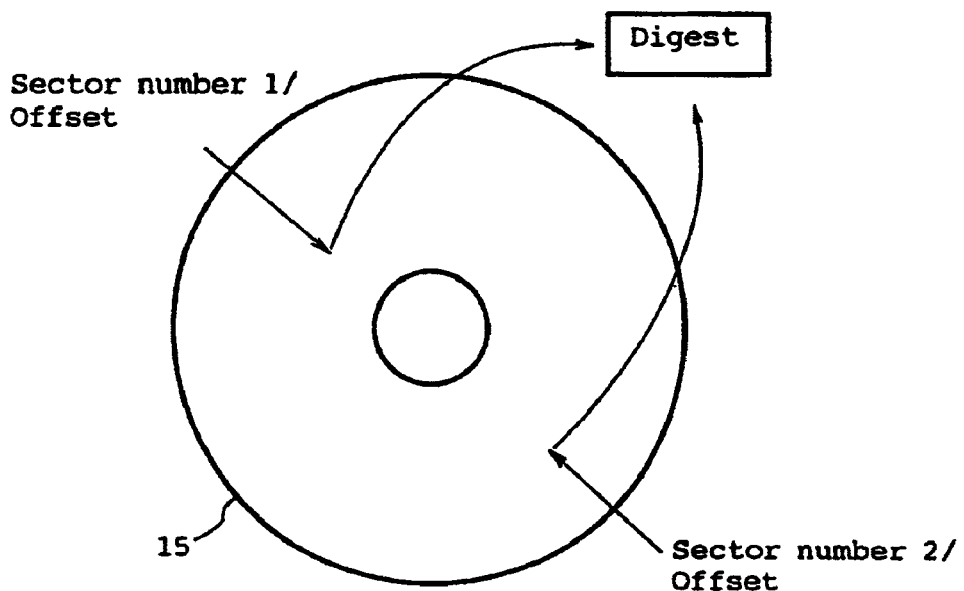
FIG. 4 is a table showing an example of an arrangement of a digest method file.
FIG. 5 is a diagram used to explain the significance of the digest method file entries.

As shown in FIG. 4, for example, the digest method file is formed of a table including a large number of offsets (offset numbers) of n sectors from the sector number 1 to the sector number n (where n is a number of about several tens). As shown in FIG. 5, the table designates data by referring to sectors and offsets within those sectors. The digest method file is recorded by the recording unit 7 on the hard disk 8. The random data is also recorded by the recording unit 7 on the hard disk 8.

The processing proceeds to step S2. The reproducing unit 9 reproduces the random data according to the digest method file, which is determined in step S1 and recorded on the hard disk 8, by retrieving the data specified by the sector numbers and offsets contained in the digest method file. The reproducing unit 9 then gathers the reproduced random data. The reproducing apparatus 9 supplies these gathered random data to the encryption-key generating unit 4.

In step S3, the encryption-key generating unit 4 subjects the random data supplied from the reproducing unit 9 to a predetermined calculation (e.g., addition) or generates the encryption key (inherent value, disk digest) from the random data itself as shown in FIG. 5. Then, the processing proceeds to step S4. In step S4, the encryption-key generating unit 4 supplies the generated encryption key to the encrypting unit 3. The encrypting unit 3 encrypts the data supplied from the data generating unit 2 based on the supplied encrypting key. The encrypting unit 3 supplies the encrypted data to the recording unit 7. Then, the recording unit 7 records the encrypted data on the hard disk 8.

Then, the processing proceeds to step S5. The reproducing unit 9 reproduces the recorded encrypted data, the random data which is the information inherent in the recording medium, and the digest method file indicative of the predetermined portion of the data where the random data is recorded on the hard disk 8, and supplies them to the formatting unit 10. The formatting unit 10 then generates the pre-master image (format signal) from the encrypted data, the random data and the digest method file. At this time, as described above, the formatting unit 10 formats the random data as a normal file according to the ISO9660 standard. Moreover, the formatting unit 10 can format the random data as an interleaved file or a multi extent file to be dispersed.

The formatting unit 10 supplies the produced pre-master image to the recording unit 7. The recording unit 7 temporarily records the pre-master image on the hard disk 8. The reproducing unit 9 reproduces the pre-master image recorded on the hard disk 8 and supplies the reproduced data to the recording unit 11. The recording unit 11 records the reproduced data supplied from the reproducing unit 9 on the master disk 12. Alternatively, the formatting unit 10 can supply the pre-master image, i.e., the formatting signal directly to the recording unit 11 which records the pre-master image on the master disk 12.

The disk producing apparatus 13 employs the master disk thus produced as an original disk to reproduce a large number of the disks (slave disks such as a DVD, an optical disk, a magneto-optical disk, or the like) 15. When the magnetic tape is employed as the recording medium, a transfer apparatus may be employed to transfer signals recorded on a master magnetic tape to a large number of slave magnetic tapes.

Figure 6:
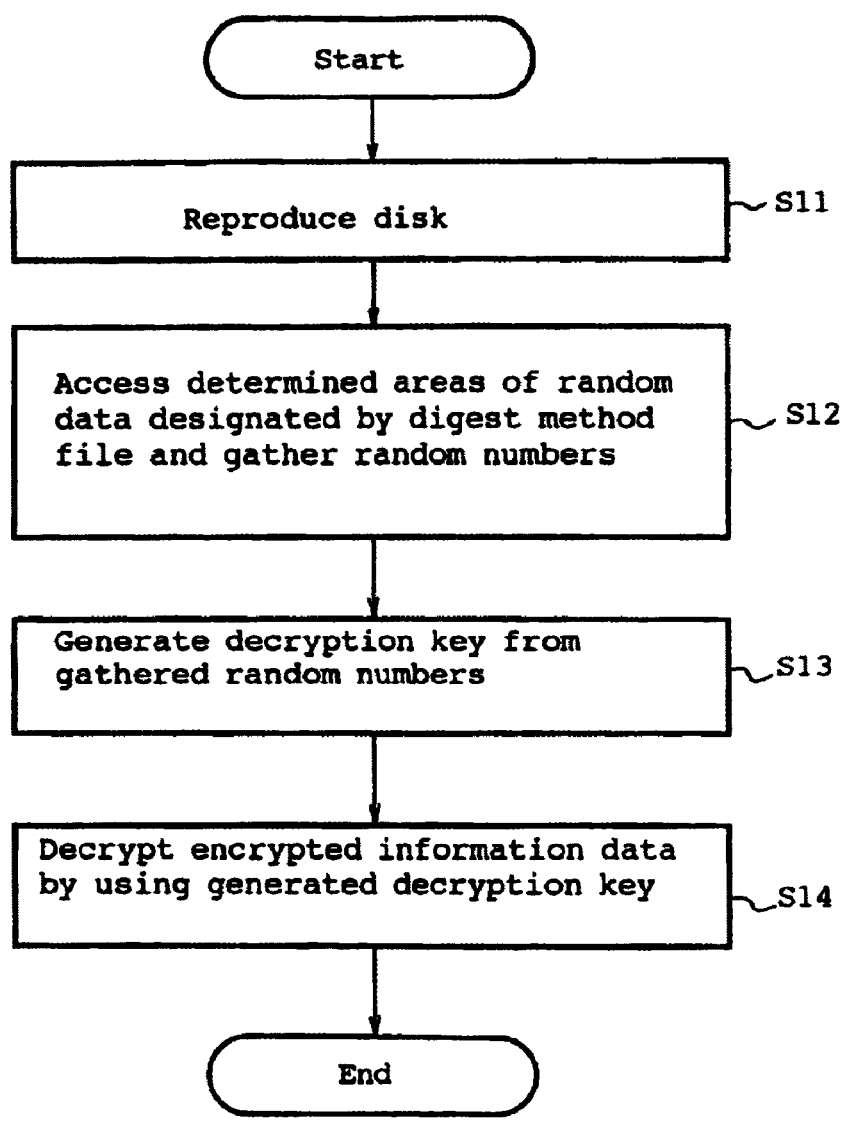
FIG. 6 is a flowchart used to explain a decrypting operation of a decrypting apparatus according to the first embodiment of the present invention.

A decrypting operation of the decrypting apparatus 14 will be described with reference to FIG. 6 which is a flowchart therefor. in step S11, the reproducing unit 16 reproduces the signals recorded on the disk 15. The reproducing unit 16 supplies the reproduced signal to the decrypting unit 17 and, when the decryption-key generating unit 18 supplies a gate signal to the reproducing unit 16, also supplies a file of the recorded signal where the random data is stored and the digest method file to the decryption-key generating unit 18.

The processing proceeds to step S12. In step S12, the decryption-key generating unit 18 extracts from the random data supplied from the reproducing unit 16 the random data designated by the digest method file.

Then, the processing proceeds to step S13. In step S13, the decryption-key generating unit 18 generates the decryption key corresponding to the original encryption key from the random data gathered in step S12 and subjected to the predetermined calculation (e.g., addition), or from the random data itself. The decryption-key generating unit 18 supplies the generated decryption key to the decrypting unit 17. Then, the processing proceeds to step S14. In step S14, the decrypting unit 17 decrypts the reproduced data supplied from the reproducing unit 16, i.e., the encrypted data (cryptogram) based on the decryption key supplied from the decryption-key generating unit 18, thus obtaining the original data (e.g. plain text) generated by the data generating unit. The describing unit 18 outputs the original data through the output terminal 19.

If the encrypting apparatus 1 records pit strings of the recording signal on the track of the master disk 12 in a wobbled fashion, then the inherent information generating unit 5 may generate a wobbling signal indicative of the wobbling of the pit strings of the recording signal to be recorded on the master disk 12 as the information signal inherent in the recording medium 12. If the information inherent in the disk 15 as the recording medium is a physical information to be formed on the disk 15 and a track on which the recording signal of the master disk 12 is to be recorded is a wobbled pregroove or a wobbled land portion, the wobbling signal corresponding to the pregroove or the land portion may be generated as the information signal inherent in the recording medium from the inherent information generating unit 5.

The encryption-key generating unit 4 generates an encryption key based on the wobbling signal and supplies the generated encryption key to the encrypting unit 3. The encrypting unit 3 encrypts the data supplied from the information data generating unit 2 based on the encryption key supplied from the encryption-key generating unit 4.

In this case, the decrypting apparatus 14 is operated as follows. Specifically, the decryption-key generating unit 18 detects a wobbling frequency of the pregroove or the land portion corresponding to the predetermined portion of the recording signal on the disk 15. The decryption-key generating unit 18 generates the decryption key obtained by subjecting the data corresponding to the wobbling frequency to a predetermined calculation or generates the decryption key corresponding to the original encryption key based on the data itself corresponding to the wobbling frequency. The decryption-key generating unit 18 supplies the generated decryption key to the decrypting unit 17. The decrypting unit 17 decrypts the encrypted information data (cryptogram) supplied from the reproducing unit 16 by using the decryption key supplied from the decryption-key generating unit 18, to obtain the original information data (plain text).

As described above, if the information inherent in the recording medium is the physical information to be recorded on the recording medium, e.g., the wobbled pregroove or the wobbled land portion of the recording medium, then the recording medium may be a disk having a considerable thickness and a comparatively rigid substrate, such as a DVD, an optical disk, a magneto-optical disk, a hard disk or the like.

When random data is employed as the information inherent in the recording medium and the position where the random data is recorded is managed by the digest method file as described above, effective copy protection may be realized.

Since a normal file according to the ISO9660 standard is employed, the position of the file is shifted upon duplication of the file to a recording medium, and therefore, it is impossible to create a copy of the medium on which the file is recorded.

Figure 7:
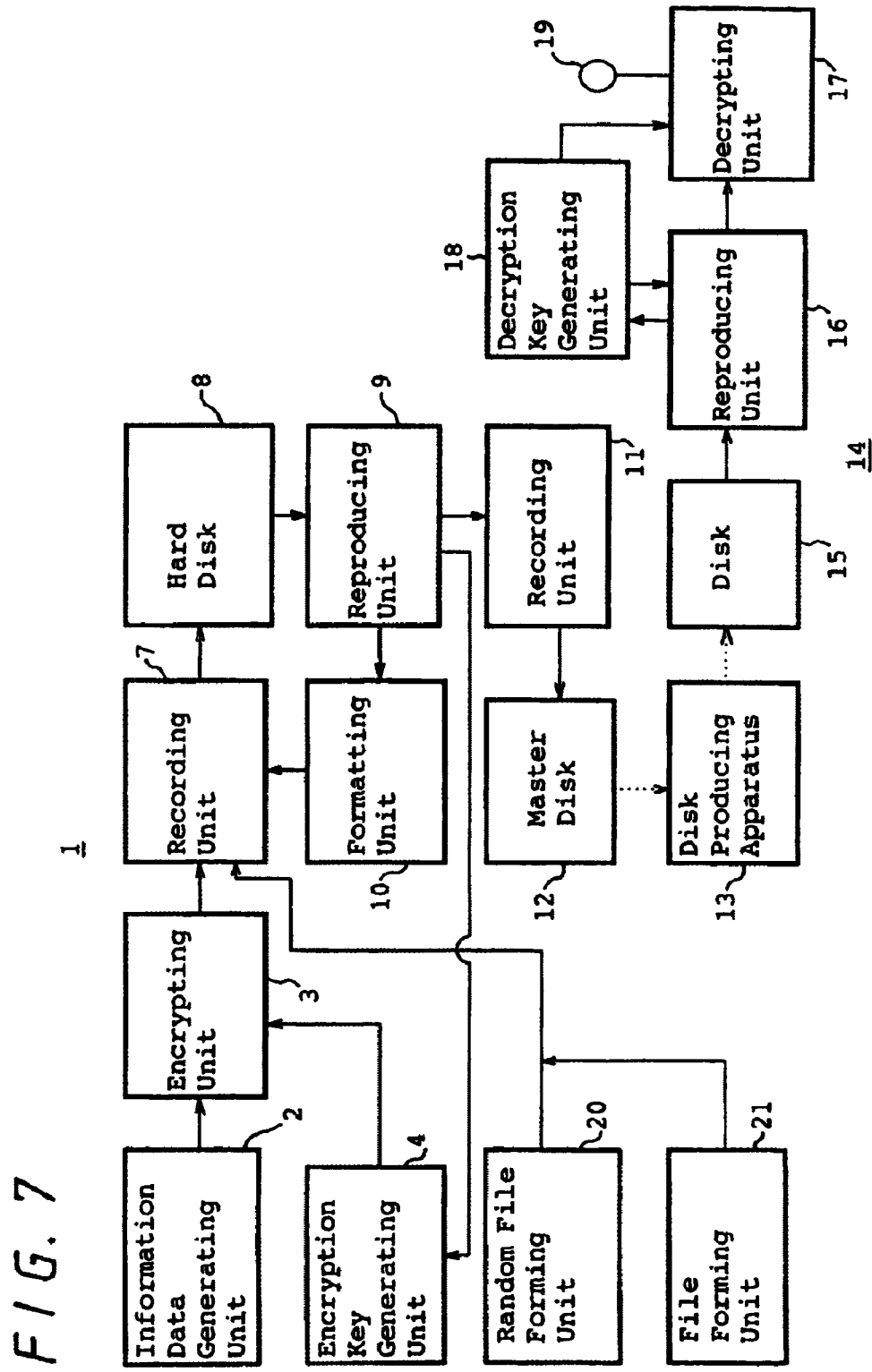
FIG. 7 is a block diagram showing an arrangement of an encrypting apparatus and a decrypting apparatus according to a second embodiment of the present invention.

FIG. 7 is a block diagram showing an arrangement of an encrypting apparatus and a decrypting apparatus, to which the encrypting and decrypting method according to the present invention is applied, according to a second embodiment of the present invention. An encrypting apparatus 1 shown in FIG. 7 has a random file forming unit 20 instead of the inherent information generating unit 5 of the encrypting apparatus 1 shown in FIG. 1 and also has a file forming unit 21 for forming a file indicative of a predetermined portion of the random file instead of the file forming unit 6 for forming a file indicative of the predetermined portion of the encrypted information. Other arrangements and operations of the encrypting and decrypting apparatus 1 and 14 shown in FIG. 7 are similar to those of the encrypting and decrypting apparatus 1, 14 shown in FIG. 1 and hence will not be described.

Figure 8:
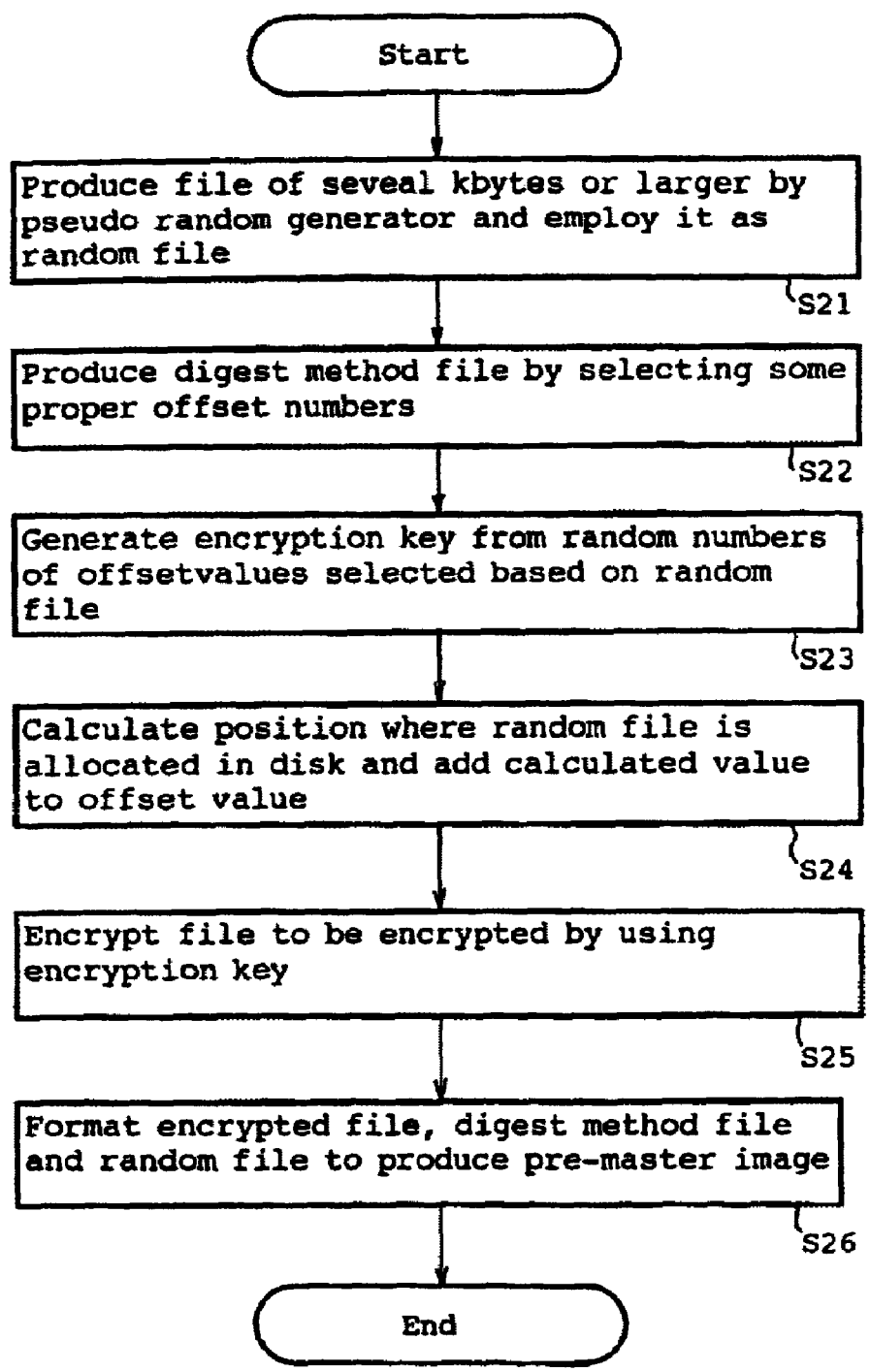
FIG. 8 is a flowchart used to explain an encrypting operation of an encrypting apparatus according to the second embodiment of the present invention.

An operation of the encrypting apparatus 1 shown in FIG. 7 will be described with reference to FIG. 8 which is a flowchart therefor. The random file forming unit 20 includes a pseudo random data generator generating a random data. In step S21, the random file forming unit 20 produces a random file including random data of, for example, several kbytes or larger generated by the pseudo random data generator. The random file forming unit 20 supplies the random file, for example, to the recording unit 7. The recording unit 7 records the random file on the hard disk 8.

Then, the processing proceeds to step S22. In step S22, the file forming unit 21 determines from which portions of the random file random-number data (random data) used for obtaining an inherent value (encryption key) is gathered, i.e., determines from which portion(s) of the random data the random data is gathered (e.g. from a predetermined sector/offset to another predetermined sector/offset, or from a plurality of predetermined non-adjacent portions designated by sectors and/or offsets. The file forming unit 21 forms a digest method file indicative of the portion(s) of the random data and supplies the digest method file to the recording unit 7. The recording unit 7 once records the digest method file on the hard disk 8. Finally, the reproducing unit 9 reads out the recorded digest method file form the hard disk 8 and supplies the reproduced digest method file to the recording unit 11, and the recording unit 11 records the digest method file on the master disk 12.

Then, the processing proceeds to step S23. In step S23, the reproducing unit 9 reproduces the random data, recorded on the hard disk based on the information. The reproducing unit 9 supplies the reproduced random data to the encryption-key generating unit 4. The encryption-key generating unit 4 generates the encryption key (inherent value) (disk digest) from the random data itself or the random data subjected to the predetermined calculation.

Then, the processing proceeds to step S24. In step S24, the position where the random file is allocated in the master disk 12 is calculated, i.e., an offset value is calculated and added to the offset(s) specified in the digest method file. Thus, the digest method file is modified.

Then, the processing proceeds to step S25. In step S25, the encryption-key generating unit 4 supplies the generated encryption key (the inherent value) (disk digest) to the encrypting unit 3. The encrypting unit 3 encrypts the data supplied from the information data generating unit 2 and supplies the encrypted information data to the recording unit 7. The recording unit 7 records the encrypted data on the hard disk 8.

Then, the processing proceeds to step S26. In step S26, the reproducing unit 9 reproduces the encrypted data, the signal indicative of the information inherent in the recording medium, and the digest method file and supplies them to the formatting unit 10. The formatting unit 10 formats the information data, the information signal and the digest method file to produce the pre-master image. In this formatting operation, as described above, the formatting unit 10 can format the random file as an interleaved file or a multi extent file.

The formatting unit 10 supplies the pre-master image to the recording unit 7 and the recording unit 7 records the pre-master image on the hard disk 8. The reproducing unit 9 then reproduces the pre-master image recorded on the hard disk 8 and supplies the reproduced pre-master image to the recording unit 11. The recording unit 11 records on the master disk 12 either the pre-master image supplied from the reproducing unit 9 or the pre-master image supplied directly from the formatting unit 10.

The disk producing apparatus 13 uses the master disk 12 as an original disk for generating a large number of disks (slave disks) through duplication.

Figure 9:
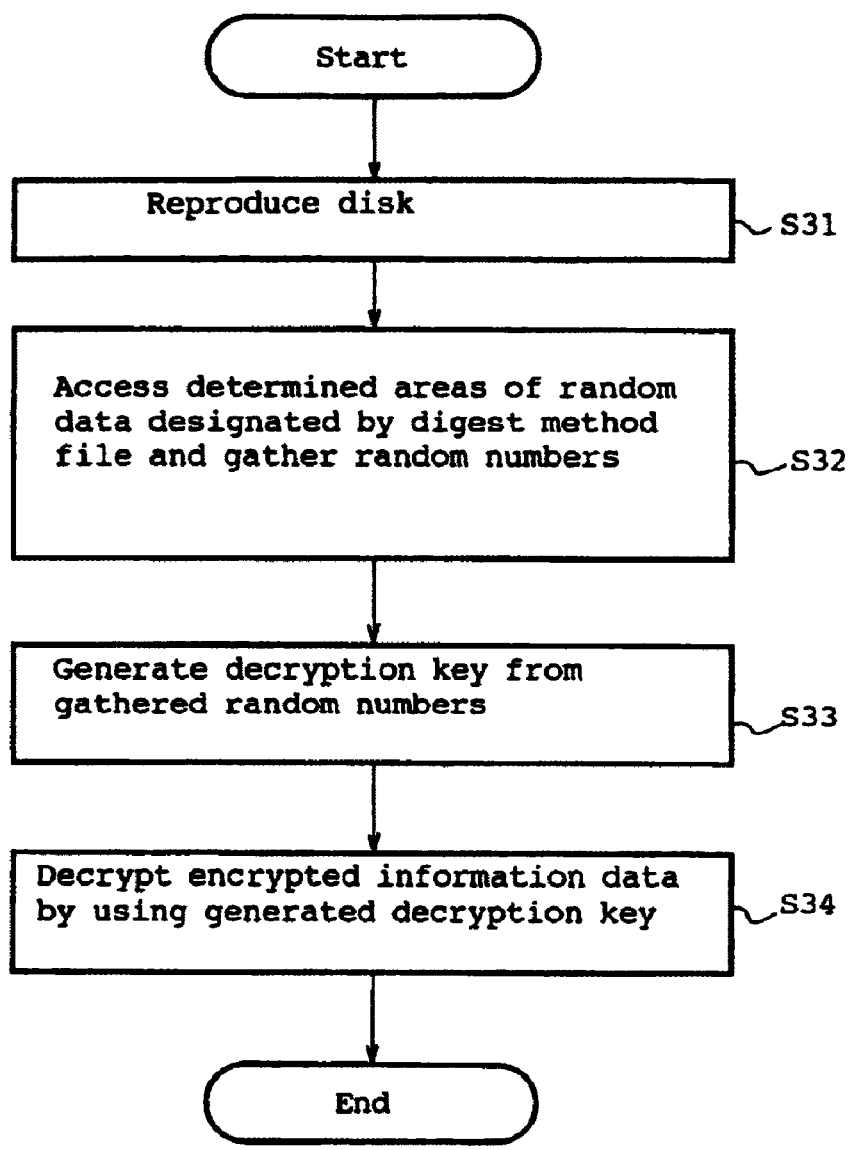
FIG. 9 is a flowchart used to explain a decrypting operation of a decrypting apparatus according to the second embodiment of the present invention.

A decrypting operation of the decrypting apparatus 14 shown in FIG. 7 will be described with reference to FIG. 9 which is a flowchart therefor. In step S31, the reproducing unit 16 reproduces the disk 15 and supplies the reproduced data to the decryption-key generating unit 18. Then, in step S32, the decryption-key generating unit 18 extracts from the reproduced data the random data, designated by the digest method file.

Then, the processing proceeds to step S33. In step S33, the decryption-key generating unit 18 generates the decryption key obtained by subjecting the random data to a predetermined calculation, or the decryption key corresponding to the original encryption key based on the random data itself, and supplies the generated decryption key to the decrypting unit 17. In step S34, the decrypting unit 17 decrypts the encrypted data (cryptogram) supplied from the reproducing unit 16 by using the decryption key supplied from the decryption-key generating unit 18 to obtain the original data (e.g. plain text). The decrypting unit 17 outputs the original data through the output terminal 19.

Figure 10:
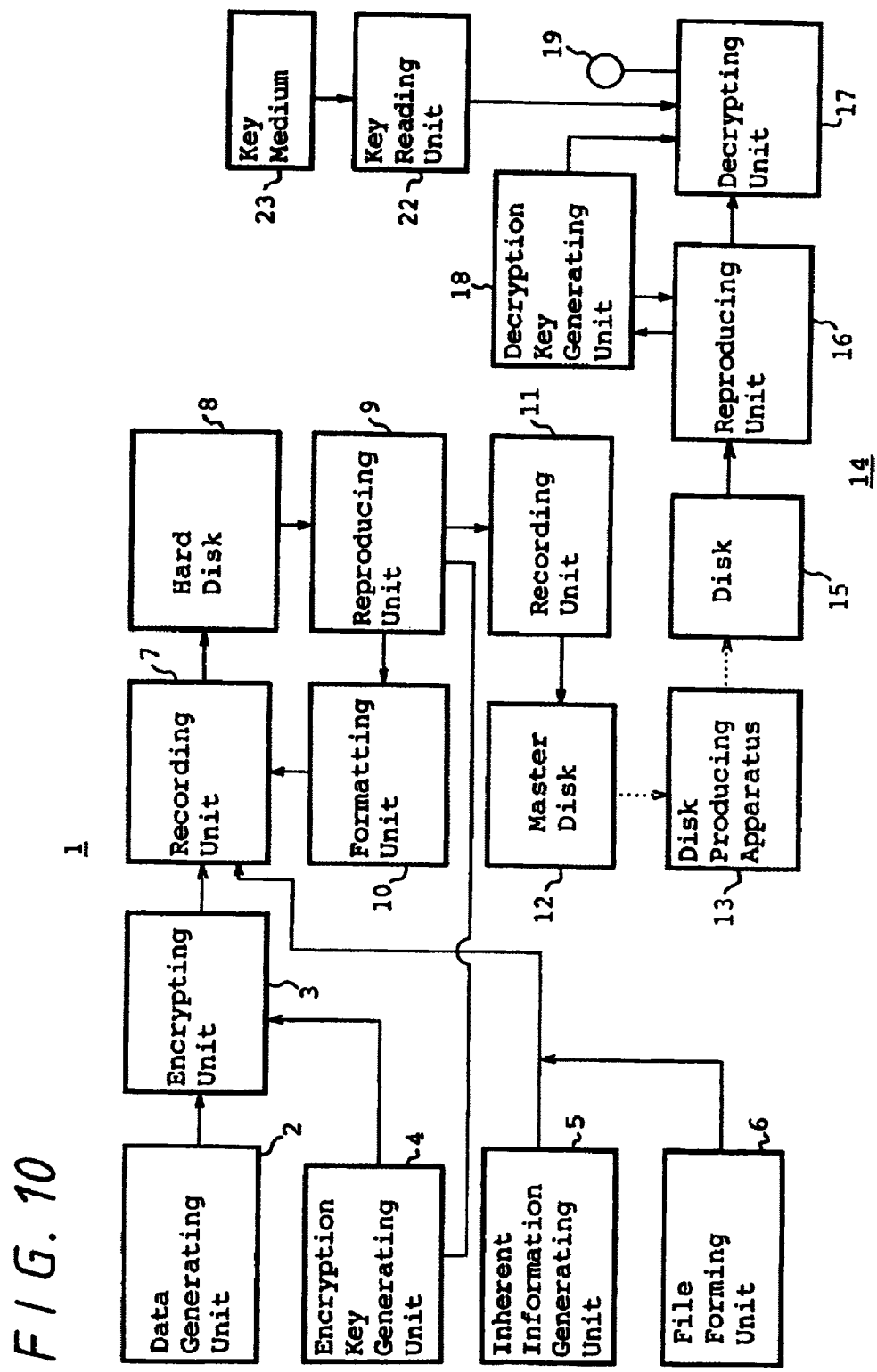
FIG. 10 is a block diagram showing an arrangement of an encrypting apparatus and a decrypting apparatus according to a third embodiment of the present invention.

FIG. 10 is a block diagram of an encrypting apparatus and a decrypting apparatus according to a third embodiment of the present invention. The arrangement of the encrypting apparatus 1 shown in FIG. 10 is basically similar to the encrypting apparatus shown in FIG. 1 and hence will not be described.

Figure 11:
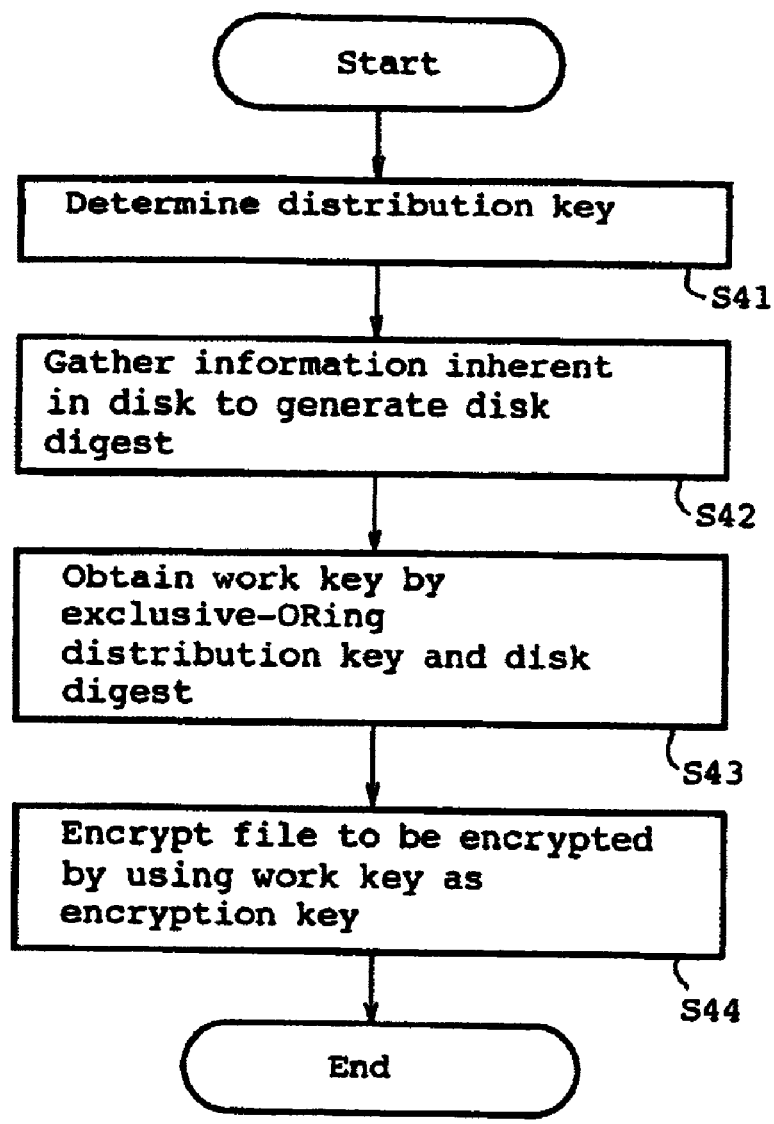
FIG. 11 is a flowchart used to explain an encrypting operation of an encrypting apparatus according to the third embodiment of the present invention.

An encryption method employed by the encrypting apparatus 1 shown in FIG. 10 will be described with reference to FIG. 11 which is a flowchart therefor. In step S41, a distribution key (distribution-key data) to be distributed to a user is determined, and is registered in a memory (e.g., a semiconductor memory) in the encryption-key generating unit 4. The distribution key may be registered In a central processing unit (CPU) (which may include the memory) instead of the memory.

Then, the processing proceeds to step S42. In step S42, in a manner similar to that described with reference to the flowchart of FIG. 3, the encryption-key generating unit 4 gathers the information inherent in the disk 15 and subjects the information to a predetermined calculation to generate a disk digest (key). In step S43, the encryption-key generating unit 4 subjects the distribution key determined in step S41 and the disk digest generated in step S42 to a predetermined calculation, e.g., exclusive-ORs the distribution key and the disk digest and sets the calculated result as a work key.

The processing proceeds to step S44. In step S44, the encryption-key generating unit 4 supplies the work key obtained through the calculation in step S43 to the encrypting unit 3 as the encryption key. The encrypting unit 3 encrypts the data based on the encryption key and supplies the encrypted data to the recording unit 7. The recording unit 7 records the encrypted data on the hard disk 8.

The decrypting apparatus 14 shown in FIG. 10 has a key reading unit 22 and a key medium 23, elements provided in addition to those of the decrypting apparatus 14 shown in FIG. 1. The key medium 23 is arranged such that the above-mentioned distribution key can be distributed. For example, the distribution key may be printed On some suitable object in the form of Arabic numerals, symbols, bar codes, other codes similar to the bard codes, or the like. The key medium 23 can be, for instance, a card or the disk 15 itself.

The key medium 23 may include a memory, such as a semiconductor memory or the like storing the distribution key, or may include a CPU or the like having a memory. The key medium 23 which is in the form of a memory or CPU may be a card (e.g., an integrated circuit (IC) card) or the like. Furthermore, the key medium 23 may be arranged such that the distribution key is recorded thereon magnetically or optically. The key medium would be sold alone or together with a reproducing apparatus for reproducing the disk 15. The key reading unit 22 reads out the distribution key printed on or recorded on the key medium 23.

Figure 12:
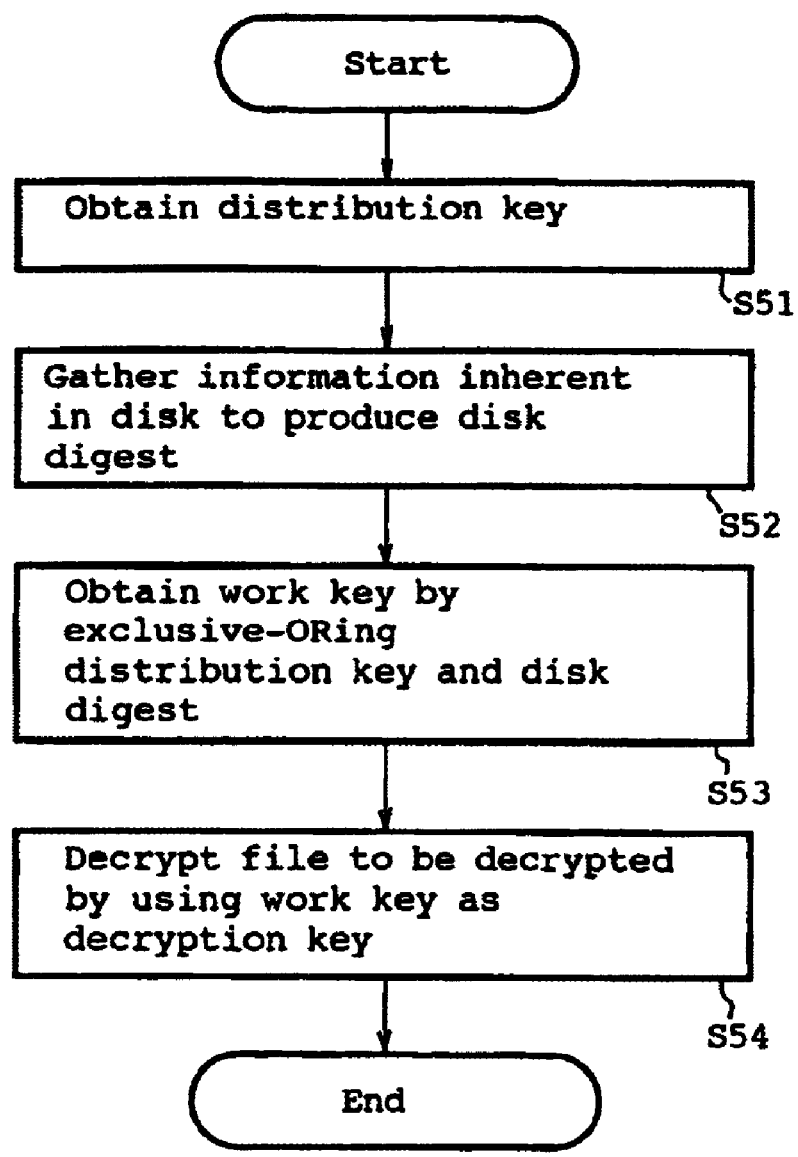
FIG. 12 is a flowchart used to explain a decrypting operation of a decrypting apparatus according to the third embodiment of the present invention.

A decrypting operation of the decrypting apparatus 14 shown in FIG. 10 will be described with reference to FIG. 12 which is a flowchart therefor. In step S51, the key reading unit 22 reads out the distribution key printed on or recorded on the key medium 23 and supplies the distribution key to the decryption-key generating unit 18. Then, the processing proceeds to step S52. In step S52, in a manner similar to that described with reference to FIG. 6, the decryption-key generating unit 18 gathers the information inherent in the disk 15 and subjects the information to a predetermined calculation, thereby obtaining the disk digest (key) corresponding to the original disk digest (key).

Then, the processing proceeds to step S53. In step S53, the decryption-key generating unit 18 subjects the distribution key obtained in step S51 and the disk digest obtained in step S52 to a predetermined calculation, e.g., exclusive-ORs the distribution key and the disk digest, thereby obtaining the work key. In step S54, the decryption-key generating unit 18 supplies the work key obtained in step S53 to the decrypting unit 17 for use as the decryption key. The decrypting unit 17 decrypts the encrypted data supplied from the reproducing unit 16 by using the decryption key supplied from the decryption-key generating unit 18 and then outputs the decrypted data through the output terminal 19.

Figure 13:
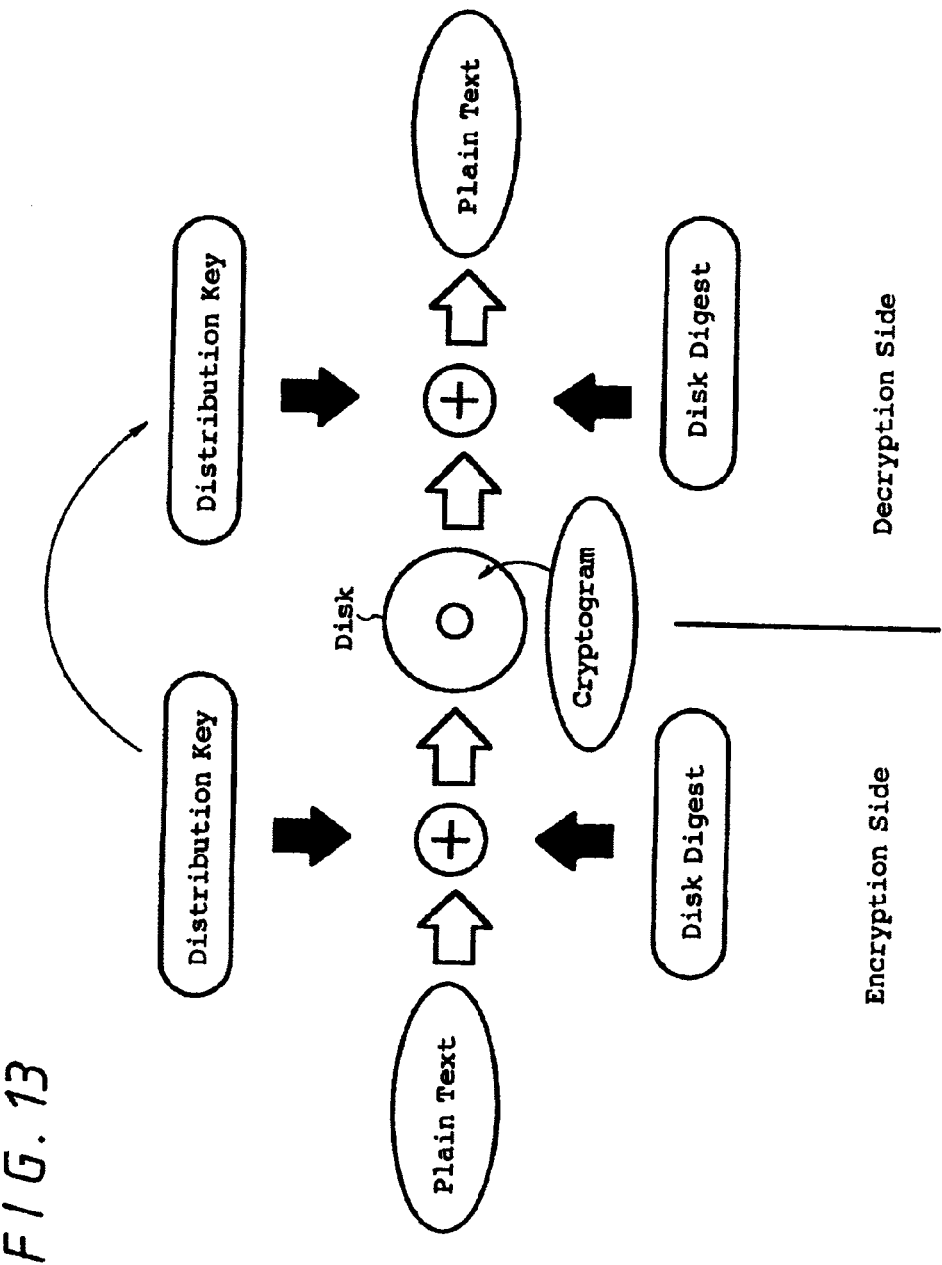
FIG. 13 is a diagram used to explain encrypting and decrypting methods employed by the encrypting and decrypting apparatus according to the third embodiment.

FIG. 13 is a diagram used to explain the encryption method and the decryption method respectively employed in the encrypting apparatus 1 and the decrypting apparatus 14 shown in FIG. 10. Initially, the data (e.g. plain text) is encrypted based on the distribution key and the disk digest, and the resulting cryptogram is recorded on the disk. The distribution key is supplied to a user through a route other than the disk. The cryptogram read out from the disk is decrypted based on a key that is derived by operating on the disk digest and distribution key.

Figure 14:
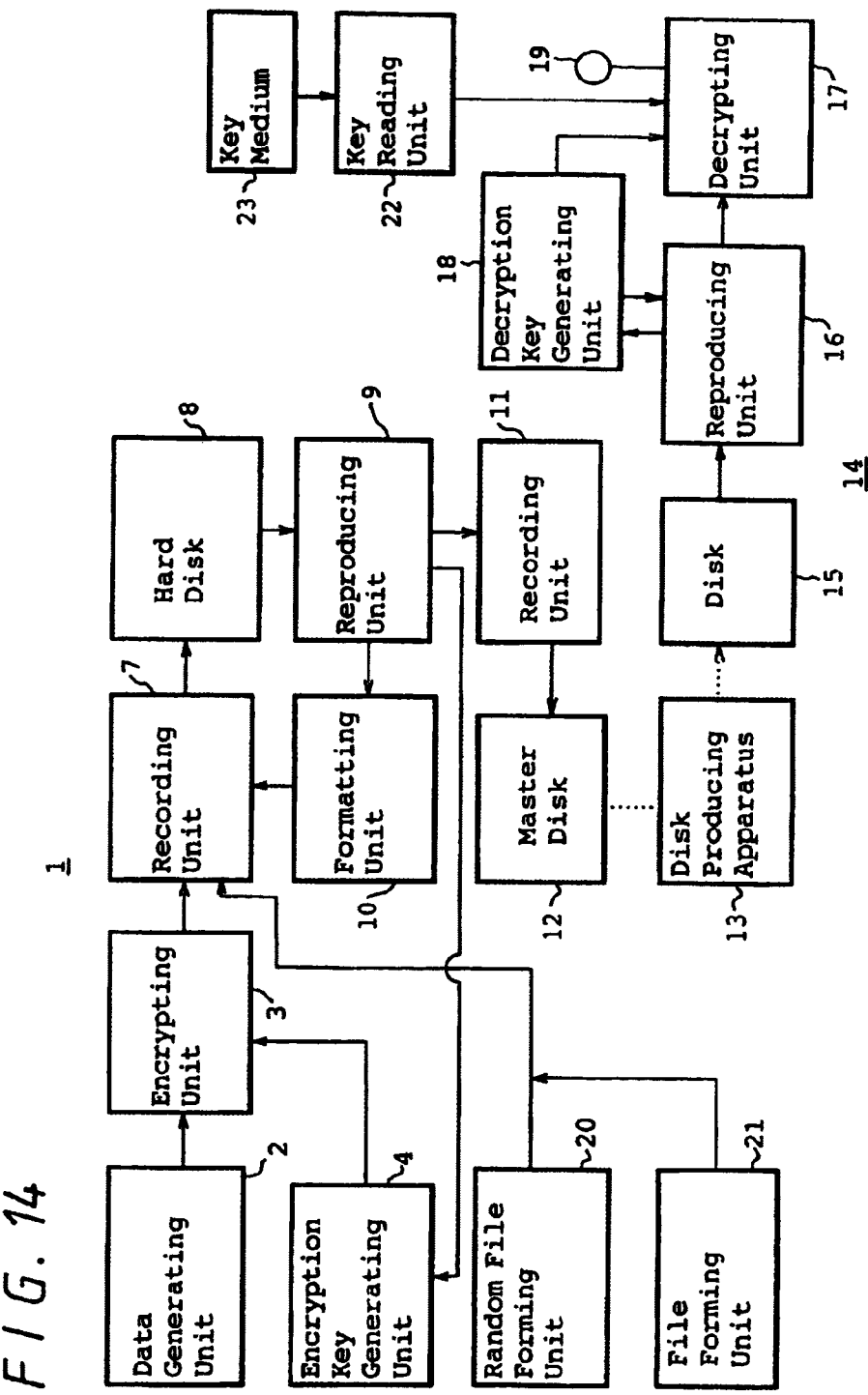
FIG. 14 is a block diagram showing an arrangement of an encrypting apparatus and a decrypting apparatus according to a fourth embodiment of the present invention.

FIG. 14 is a block diagram showing an encrypting apparatus and a decrypting apparatus according to a fourth embodiment of the present invention.

An encrypting apparatus 1 shown in FIG. 14 has a random file forming unit 20 and a file forming unit 21 for forming a file indicative of a predetermined portion of the random file, both similar to those shown in FIG. 7 and replacing the inherent information generating unit 5 and the file forming unit 6 of the encrypting apparatus 1 shown in FIG. 10. The random file forming unit 20 and the file forming unit 21 are operated in a manner similar to the corresponding elements described with reference to FIG. 7, the other units of FIG. 14 are operated in a manner similar to the corresponding elements described with reference to FIG. 10. Therefore, the operations of the encrypting apparatus 1 and the decrypting apparatus 14 shown in FIG. 14 will not be described. The encrypting apparatus 1 and the decrypting apparatus 14 of FIG. 14 can carry out the operations of encrypting data (e.g. plain text) and decrypting the resulting cryptogram by the method shown in FIG. 13.

Regardless of the encrypting apparatus 1 employed (first, second, third, or fourth embodiment), it is impossible to make a copy of data from original recording to another recording medium, because the position of the data is shifted during the dubbing process. Therefore, it is impossible to decrypt encrypted data from the dubbed medium. Moreover, even if data recorded on the dubbed medium can be decrypted, it is impossible to output the decrypted data through the output terminal as the digital signals. As a result, use of the encrypting apparatus and method of the present invention makes it difficult to copy data on an original recording medium to another recording medium.

When the random file is arranged as an interleaved file or multi extent file, it is even more difficult to match the position(s) of the random data recorded on the original disk with the positions of the random data on the copied disk. Therefore, the illegitimate dubbing can be prevented.

In each of the first to fourth embodiments, as shown in FIG. 15, the information inherent in the disk 15 can be recorded by ultraviolet laser or the like on a disk surface, i.e., a surface of the disk substrate 33.

When the information inherent in the disk which is recorded on the surface of the disk substrate 33 is read out, rays of light must be directed onto the surface of the disk substrate 33 by moving an optical head (not shown) in the direction perpendicular to the disk surface, and further a special reading apparatus and a special reading command (e.g., a command to move the optical head in the direction perpendicular to the disk surface) are required. Therefore, it becomes difficult to read the information thus recorded, and it becomes impossible to easily copy such information.

This arrangement is effective in protecting the information from optical copying and so-called "peel and copy" copying. Optical copying refers to irradiating the pits 32 of the disk substrate 33 and copying the pit arrangement on the basis of the reflected light. Copying by "peel and copy" refers to physically copying pits 32 formed on the disk substrate 33 after a protective film 31 is peeled from the disk substrate 33.

The apparatus and methods according to the first to fourth embodiments of the present invention can be used in communication, such as in wire communication (e.g., communication through an electric cable, an optical fiber cable or the like), wireless communication (communication utilizing electric waves, light, sound waves or the like), or the like. In these cases, the encrypting apparatus 1 supplies the cryptogram to the decrypting apparatus 14 through the wire communication or the wireless communication.

While the file is formatted in accordance with the ISO9660 standard in the first to fourth embodiments, the present invention is not limited thereto. While the work key is generated by operating on the distribution key and the disk digest, the present invention is not limited thereto. The work key may be generated, for example, by operating on the distribution key and the wobbling signal.

According to the encrypting apparatus and method of the present invention, since the information inherent in the recording medium may be set as the frequency of predetermined portion(s) of the wobbled pregroove or wobbled land, it is possible to realize strong copy protection of recorded information.

According to the encrypting apparatus and method of the present invention, since the information inherent in the recording medium may be set as random data to be inserted into predetermined portion(s) of the encrypted information to be recorded on the recording medium, and the insertion positions of the random-data may be dispersed, making it difficult to read the random data. Thereby, providing strong copy protection of the recorded information.

According to the encrypting method of the present invention, since a work key may be generated from a disk digest key (generated from the information inherent in the recording medium) and a distribution key (independent of the work key), and the information to be recorded on the recording medium is encrypted by using the work key, effective copy protection of recorded information is provided.

According to the decrypting apparatus and method of the present invention, the encryption key is generated based on the random data inserted into predetermined portion(s) of the encrypted information recorded on the recording medium. By using the encryption key, a first file and a second file are reproduced from the recording medium. The data stored in the first file includes encrypted data and random data. The data stored in the reproduced second file indicates predetermined portion(s) of the first file where the random data is located. The decryption key is generated from the detected random data, and the encrypted data of the reproduced first file is decrypted using the decryption key.

According to the decrypting method of the present invention, the encryption key may be generated on the basis of the wobbling frequency of predetermined portion(s) of the encrypted information to be recorded on the recording medium. By using the encryption key, a first file and a second file are reproduced from the recording medium. Based on the data stored in the reproduced second file and indicating a predetermined portion of the encrypted information, the wobbling frequency of the predetermined portion of the encrypted information is detected. The decryption key is generated based on the detected wobbling frequency and the encrypted information of the reproduced first file is decrypted using the decryption key.

According to the decrypting method of the present invention, the encryption key may be generated based on the frequency of predetermined portion(s) of the wobbled pregroove or wobbled land portion to be formed on the recording medium. By using the encryption key, a first file and a second file are reproduced form the recording medium. The second file contains data indicative of predetermined portion(s) of the wobbled pregroove and/or wobble land portion to be formed on the recording medium. Based on the data stored in the reproduced second file, the wobbling frequency of the predetermined portion(s) of the pregroove or land portion is detected. The decryption key is generated based on the detected wobbling frequency and the encrypted information of the reproduced first file is decrypted by using the decryption key.

According to the decrypting method of the present invention, the encryption key is generated based on random data selected from predetermined portion(s) of a random file formed of random data generated by a pseudo random data generator. The file storing the information encrypted by using the encryption key, the file storing the data indicative of the predetermined portion(s) of the random file, and the random file are reproduced. Based on the file storing the data indicative of the predetermined portion(s) of the reproduced random file, the decryption key is generated (i.e. generated according to the random data at the portions indicated by the random file). By using the decryption key, the encrypted information reproduced from the recording medium is decrypted.

According to the decrypting method of the present invention, decryption is performed by using a work key that is generated from a disk digest (generated from information inherent in a recording medium) and a distribution key (independent of the disk digest encryption key). The disk digest is generated from the information inherent in the recording medium where the encrypted information is recorded. The work key is generated based on the disk digest and distribution key recorded on a predetermined key medium. By using the work key, the information encrypted by using the work key and reproduced from the recording medium is decrypted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method of encrypting information to generate encrypted data and recording the encrypted data onto a recording medium, comprising the steps of:
generating an encryption key based on key data which is recorded to one or more predetermined regions on the same surface as the encrypted data and determined from a wobbling frequency of said recording medium yet is not part of said encrypted data; and
encrypting the information based on said encryption key.

2. An apparatus for encrypting information to generate encrypted data and recording the encrypted data onto a recording medium, comprising:
means for generating an encryption key based on key data which is recorded to one or more predetermined regions on the same surface as the encrypted data and determined from a wobbling frequency of said recording medium yet is not part of said encrypted data; and
means for encrypting the information based on said encryption key.

3. A method of recording information on a recording medium, comprising the steps of:
receiving said information in the form of encrypted data which represents said information, said encrypted data having been generated through the use of an encryption key, wherein said encryption key is based on key data which is recorded to one or more predetermined regions on the same surface as the encrypted data and determined from a wobbling frequency of said recording medium yet is not part of said encrypted data; and
recording said received encrypted data on said recording medium.

4. The method according to claim 3, wherein said key data includes the wobbling frequency of a wobbled pre-groove and/or wobbled land portion of said recording medium.

5. The method according to claim 4, further comprising the steps of generating a file indicative of one or more positions on said recording medium and recording said file on said recording medium; wherein the frequency of at least one wobbled pre-groove and/or at least one wobbled land portion located at said positions is used as said key data.

6. A method of encrypting information to generate encrypted data and recording the encrypted data onto a recording medium, comprising the steps of:
generating an encryption key based on key data which is recorded to predetermined regions on the same surface as the encrypted data and determined from said recording medium yet is not part of said encrypted data; and
encrypting the information based on said encryption key;
wherein said key data is random data from a source different than that of said encrypted data which has been inserted in-between said encrypted data at predetermined positions.

7. The method according to claim 6, further comprising the steps of:
generating a file indicative of a predetermined portion of said random data; and
recording said file on said recording medium.

8. The method according to claim 6, wherein said random data is recorded on said recording medium as a normal file according to the ISO9660 standard.

9. The method according to claim 6, wherein said random data is recorded on said recording medium as an interleaved file.

10. The method according to claim 6, wherein said random data is recorded on said recording medium as a multi extent file.

11. The method according to claim 6, wherein said random data is recorded in a pre gap area of a file according to the ISO9660 standard.

12. The method according to claim 6, wherein said random data is recorded in a system area of a file according to the ISO9660 standard.

13. The method according to claim 6, wherein said random data is recorded in an application area of a primary volume descriptor of a file according to the ISO9660 standard.

14. The method according to claim 6, wherein said random data is recorded on a surface of said recording medium.

15. The method according to claim 6, wherein said random data is data selected from a predetermined portion of a random file.

16. The method according to claim 15, further comprising the steps of:
generating a file indicative of said predetermined portion of said random file; and
recording said file and said random file on said recording medium.

17. An apparatus for encrypting information to generate encrypted data and recording the encrypted data onto a recording medium, comprising:
means for generating an encryption key based on key data which is recorded to predetermined regions on the same surface as the encrypted data and determined from said recording medium yet is not part of said encrypted data; and means for encrypting the information based on said encryption key;

wherein said key data is random data from a source different than that of said encrypted data which has been inserted in-between said encrypted data at predetermined positions.

18. The apparatus according to claim 17, further comprising:

means for generating a file indicative of a predetermined portion of said random data, and recording said file on said recording medium.

19. The method according to claim 17, wherein said random data is recorded on said recording medium as a normal file according to the ISO9660 standard.

20. A method of recording information on a recording medium, comprising the steps of:

receiving said information in the form of encrypted data which represents said information, said encrypted data having been generated through the use of an encryption key, wherein said encryption key is based on random data from a source different than that of said encrypted data and which has been recorded to predetermined regions on the same surface as the encrypted data and inserted in-between said encrypted data yet is not part of said encrypted data; and recording said received encrypted data on said recording medium.

21. The method according to claim 20, wherein a file of said encrypted data and a file indicative of a predetermined portion of said random data are recorded on said recording medium.

22. The method according to claim 20, wherein said random data is data selected from a predetermined portion of a random file.

23. The method according to claim 22, further comprising the steps of:

generating a file indicative of said predetermined portion of said random file; and recording said file and said random file on said recording medium.

24. The method according to claim 20, wherein said random data is recorded on said recording medium as a normal file according to the ISO9660 standard.

25. A method of recording information on a recording medium, comprising the steps of:

receiving said information in the form of encrypted data which represents said information, said encrypted data having been generated through the use of an encryption key, wherein said encryption key is based on random data from a source different than that of said encrypted data which has been inserted in-between said encrypted data and recorded to the surface of said recording medium and which is not part of said encrypted data; and recording said received encrypted data on said recording medium.

26. A method of decrypting encrypted data that has been recorded on a recording medium, comprising the steps of:

reproducing a first file from said recording medium, said first file containing said encrypted data, wherein said encrypted data has been encrypted by an encryption key and said encryption key is based on random data from a source different than that of the encrypted data and which has been recorded to predetermined regions on the same surface as the encrypted data and inserted in-between said encrypted data yet is not part of said encrypted data;

reproducing a second file containing data indicative of a predetermined portion of said random data which has been recorded to and inserted into said encrypted data;

detecting random data within said encrypted data according to said second file;

generating a decryption key based on said detected random data; and decrypting said encrypted data of said reproduced first file by using said decryption key.

27. A method of decrypting encrypted data that has been recorded on a recording medium, comprising the steps of:

reproducing a first file from said recording medium, said first file which was recorded to predetermined regions on the same surface as the encrypted data on said recording medium and containing said encrypted data, wherein said encrypted data has been encrypted by an encryption key and said encryption key is based on random data from a source different than that of said encrypted data and selected from a predetermined portion of a random file;

reproducing said random file from said recording medium;

reproducing a second file from said recording medium, said second file containing data indicative of said predetermined portion of said random file;

generating a decryption key based on said random data as obtained from said random file according to said second file; and decrypting said encrypted data of said reproduced first file by using said decryption key.

28. An apparatus for decrypting encrypted data that has been recorded on a recording medium, comprising:

means for reproducing a first file from said recording medium, said first file containing said encrypted data, wherein said encrypted data has been encrypted by an encryption key and said encryption key is based on random data from a source different than that of said encrypted data and which has been recorded on one or more predetermined regions on the same surface as the encrypted data on said recording medium and which is not encrypted and which is inserted in-between said encrypted data yet is not part of said encrypted data; and for reproducing a second file containing data indicative of a predetermined portion of said random data which has been inserted into said encrypted data;

means for detecting random data within said encrypted data according to said second file;

means for generating a decryption key based on said detected random data; and means for decrypting said encrypted data of said reproduced first file by using said decryption key.

29. An apparatus for decrypting encrypted data that has been recorded on a recording medium, comprising:

means for reproducing a first file from said recording medium, said first file containing said encrypted data, wherein said encrypted data has been encrypted by an encryption key and said encryption key is based on random data from a source different than that of said encrypted data and recorded on said recording medium on one or more predetermined regions on the same surface as the encrypted data and which is not encrypted and which is selected from a predetermined portion of a random file; for reproducing said random file from said recording medium; and for reproducing a second file from said recording medium, said second file containing data indicative of said predetermined portion of said random file;

means for generating a decryption key based on said random data as obtained from said random file according to said second file; and means for decrypting said encrypted data of said reproduced first file by using said decryption key.

30. A recording medium comprising:

a storage area for storing data;

encrypted data and random data recorded therein for use in the encryption of data, said encrypted data having been encrypted according to an encryption key which is based on said random data which is obtained from a source different than that of said encrypted data and which has been inserted in-between said encrypted data at predetermined regions on the same surface as the encrypted data on said storage area.

31. The recording medium according to claim 30, further comprising data indicative of a predetermined portion of said random data.

32. A recording medium comprising:

a storage area for storing data; and encrypted data stored therein for use in the encryption of data, said encrypted data having been encrypted according to an encryption key which is based on the wobbling frequency of one or more predetermined portions of said recording medium.

33. The recording medium according to claim 32, further comprising data indicative of said one or more predetermined portions of said recording medium.

34. A recording medium comprising:

a storage area for storing data; and encrypted data and random data stored therein, said encrypted data having been encrypted according to an encryption key which is based on said random data, and wherein said random data is from a source different than that of said encrypted data and is selected from a predetermined portion of a random file and was recorded on one or more predetermined regions on the same surface as the encrypted data on said storage area.

35. The recording medium according to claim 34, further comprising stored therein data indicative of the portion of said random file corresponding to said random data.

36. A recording medium comprising:

a storage area for storing data; and encrypted data stored therein, said encrypted data having been encrypted by using a second encryption key, wherein said second encryption key is generated based on a first encryption and a third encryption key, said first encryption key which being based on key data which is recorded on one or more predetermined regions on the same surface as the encrypted data and determined from a wobbling frequency of said recording medium having recorded data therein yet is not part of said encrypted data, and said third encryption key being independent of said first encryption key.

* * * * *

UNITED STATES PATENT AND TRADEMARK OFFICE
CERTIFICATE OF CORRECTION

| | | |
|---|---|---|
| PATENT NO. | : 7,010,124 B1 | Page 1 of 1 |
| APPLICATION NO. | : 09/287924 | |
| DATED | : March 7, 2006 | |
| INVENTOR(S) | : Ryuji Ishiguro et al. | |

It is certified that error appears in the above-identified patent and that said Letters Patent is hereby corrected as shown below:

At column 10, line 25, change ""the bard codes"" to -- "the bar codes"--.

Signed and Sealed this

Seventh Day of November, 2006

JON W. DUDAS
*Director of the United States Patent and Trademark Office*